July 11, 1933.　　　　　N. DEISCH　　　　　1,917,435
ADJUSTABLE CAM MECHANISM
Original Filed Aug. 20, 1930　　　2 Sheets-Sheet 1

Inventor
*Noel Deisch*
By *Ritter, Michlin & O'Neill*
Attorneys

July 11, 1933.  N. DEISCH  1,917,435
ADJUSTABLE CAM MECHANISM
Original Filed Aug. 20, 1930   2 Sheets-Sheet 2

Inventor
Noel Deisch
By Ritter, Mechlin & O'Neill
Attorneys

Patented July 11, 1933

1,917,435

UNITED STATES PATENT OFFICE

NOEL DEISCH, OF WASHINGTON, DISTRICT OF COLUMBIA, ASSIGNOR OF ONE-HALF TO THOMAS E. STONE, JR., OF NEW YORK, N. Y.

ADJUSTABLE CAM MECHANISM

Original application filed August 20, 1930, Serial No. 476,641. Divided and this application filed July 26, 1932. Serial No. 624,888.

This application, which is a division of a prior application Serial No. 476,641, filed August 20, 1930, relates to an adjustable cam mechanism, which is exemplified as a component of the adjusting mechanism of a variable condenser, but which is also capable of use in other relations. The object of the invention is to provide a cam device including a support, preferably of disk form, and a flexible member in the form of a strip or ribbon secured to the face of the support at a plurality of points by retaining members, which are frictionally engaged with and individually movable relatively to said support, whereby stable changes may be made in the shape of said flexible member by means of an operator engaging the flexible member.

The invention is illustrated in the accompanying drawings, in which:—

Figure 1:
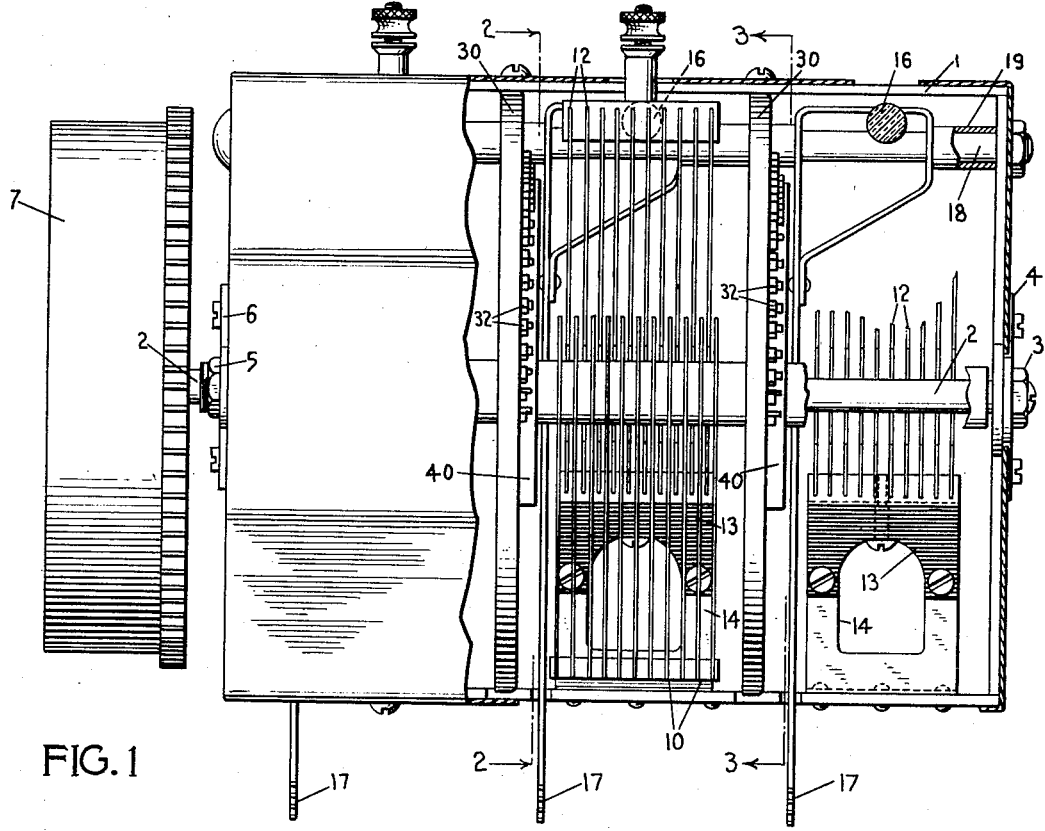
Fig. 1 is a plan view, partly in section, of a three gang condenser involving the novel cam device.
Figure 4:
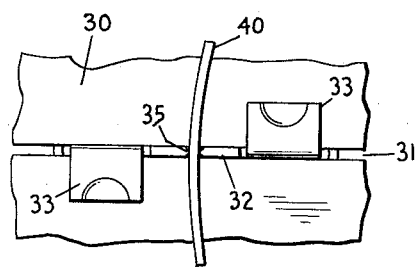
Fig. 4 is a fragmentary front elevation of one of the disks or face plates and the associated cam with the means for mounting the latter.
Figure 5:
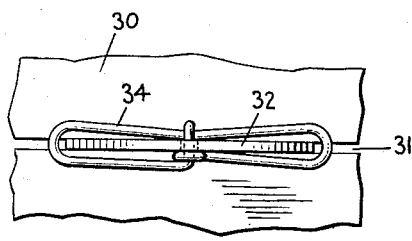
Fig. 5 is a rear elevation of the mechanism shown in Fig. 4.

Referring to the drawings, 1 indicates the usual housing or casing now employed as a shield for the condenser or condensers, on the ends of which casing there are mounted plates 4 and 6 in which are adjustably mounted the journal bearings 3 and 5 for the shaft 2 carrying the rotors of the gang condenser, one end of the shaft having mounted thereon the usual drum or dial 7 provided with the customary scale markings or indicia.

The rotor of each condenser unit consists of a series of plates 10 rigidly secured to a sleeve 11, which is pinned to the shaft 2. The cooperating stator element or member of each condenser comprises a series of plates 12 secured to a base 13, which, in turn, is fastened to the casing by means of a spring bracket 14. The plates or leaves of the stator and rotor are so disposed that the plates of the respective members alternate in various degrees of overlap, when the rotor is operated to bring the elements of the condenser into cooperative relation. The stator element of each condenser is not strictly static, but is so constructed and arranged as to be susceptible of a limited range of movement toward and from the rotor. As stated, the stator is supported at one end by a spring bracket 14 and the other end of the stator is provided with an insulating post or foot 16 secured to the cross bar 15 of the stator, which post 16 rests on the short arm of a lever 17, which is pivoted on a shaft or rod 18 fixed to the ends of the casing 1, the longer arm of the lever extending out through the slotted opening in the front of the casing. The several levers 17, which are associated with the separate condensers, are spaced on the shaft or supporting rod 18 by means of sleeves 19, so that said levers are retained in proper relation to engage the insulating posts 16 upon which the ends of the respective stators rest.

From the foregoing description, it will be apparent that moving the free ends of the levers 17 manually will effect the movement of the corresponding stators into greater or lesser overlapping relation with the coacting rotors and therefore vary the capacities of the respective condensers.

In making adjustment for a given dial setting (as, for example 650 kilocycles, as indicated on the dial), the operator manipulates the three levers 17, moving them up and down until a maximum response is secured. The usual procedure will be to progress with the corrective adjustment of the levers from the antenna circuit to the detector circuit usually from left to right, the operation preferably being performed twice in rotation, due to the slight retroactive mutual tuning action of the circuits. This adjustment of the several condensers is somewhat analogous to a "vernier" adjustment in its effect, but, in the present case, when once made, it is permanent for a given setting, that is to say, if the tuning dial is turned to some other setting and subsequently turned back to the reading of the first setting, the sub-circuits will be in perfect accord. In other words, when the several levers 17 have been adjusted to move the stators of the several condensers to effect the desired compensating capacity adjustment of the respective condensers, further manipulation of the levers in the ordinary operation of the set will not be necessary, until and unless some change in the constants of the set make a readjustment of the stator elements necessary or desirable.

Figure 6:
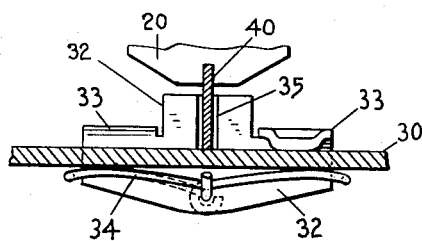
Fig. 6 is a fragmentary section through the face plate, illustrating the construction and arrangement of the cam and one of the runners.
Figure 7:
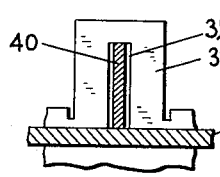
Fig. 7 is a similar view showing the form of the end runners to prevent movement of the cam in a direction normal to the face plate.
Figure 8:
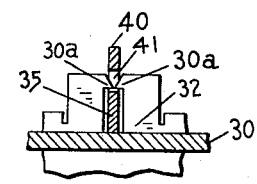
Fig. 8 is a similar view showing an intermediate runner and the mode of locking the same to the cam to prevent movement of the cam in the direction of its length.
Figure 2:
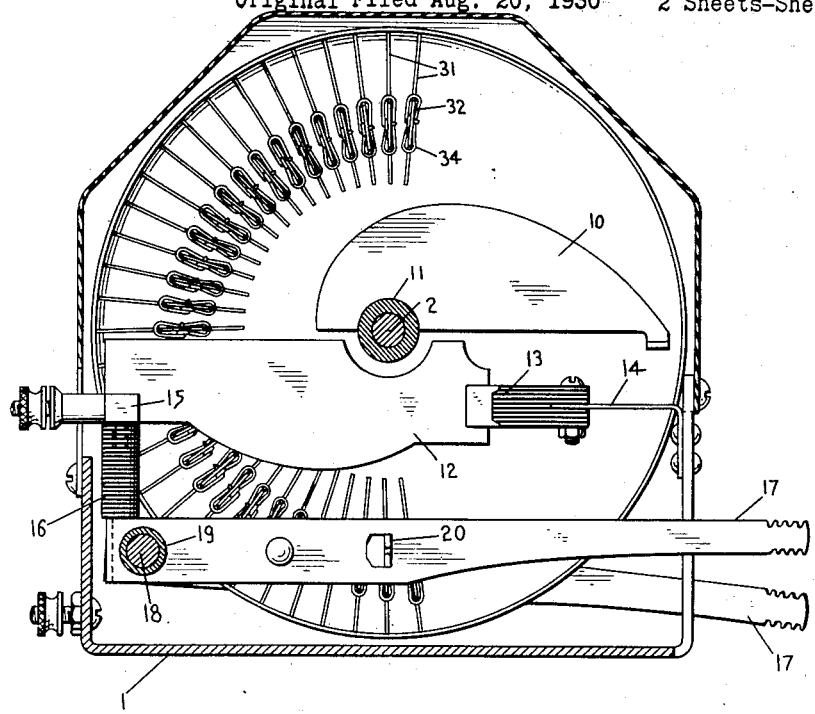
Fig. 2 is a section on line 2—2 of Fig. 1.
Figure 3:
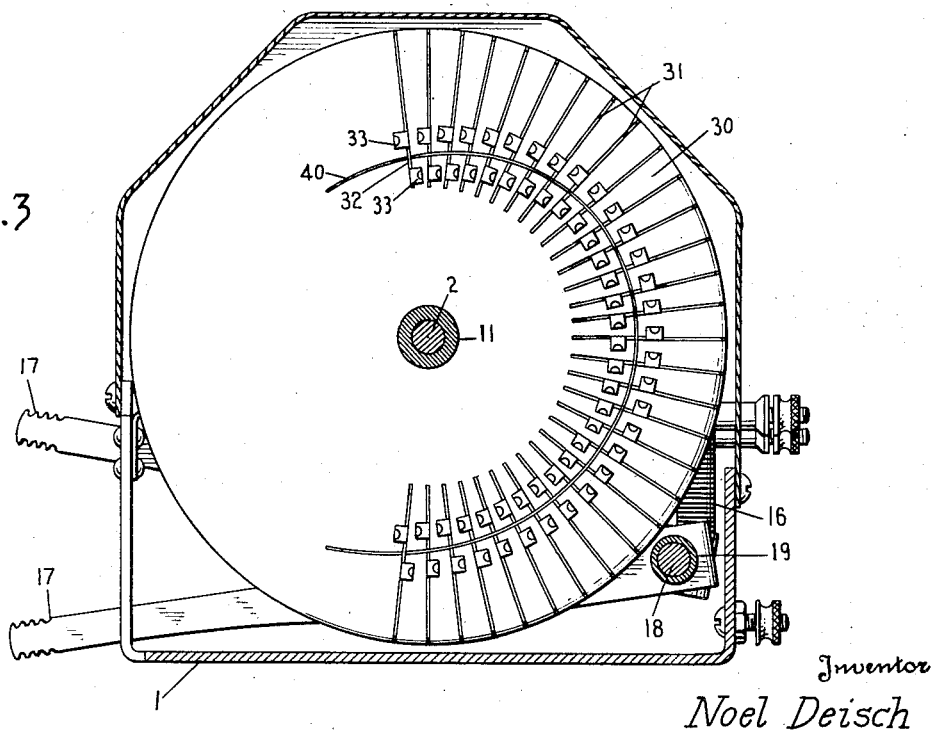
Fig. 3 is a section on line 3—3 of Fig. 1.

A manual adjustment of the several condensers by operation of the levers 17 while effective for a given dial setting, would not be similarly effective for another and different dial setting, wherefore, in order to insure the proper correctional adjustments of the stators of the several condensers throughout the range of the dial setting, the apparatus is provided with special means for automatically effecting the correctional adjustments of the several stators by the corresponding levers, which are operated by adjustable cams rotatable with the rotors, the desired adjustment of the cams being effected by the initial manual adjustment of the stators by their operating levers. To this end, there is associated with each of the condensers a face plate or disk 30, which is fixed to the sleeve 11 of the corresponding rotor and, therefore, rotates simultaneously with the rotor. Each disk or face plate 30 is provided with a series of radial slots 31, in each of which is slidably mounted a runner or support, the several runners serving to hold an adjustable cam 40 in its various positions of adjustment. Said cam comprises a flexible strip of metal, which is locked to the face plate against movement in a longitudinal direction and also in a direction normal to the surface of the face plate or disk, but is capable of being adjusted radially with respect to the disk, in whole or in part. Each of the runners includes a body portion 32 engaging a corresponding slot 31 in the disk with oppositely disposed ears 33, 33 engaging the face of the disk, a looped spring 34 serving to secure the runner to the disk with a frictional force sufficient to prevent displacement of the runner, except by engagement with positively actuated means. Each of the runners, except those at the end and the middle of the series, is provided with an open slot 35 in which the cam strip 40 is engaged, as more particularly illustrated in Fig. 6. Each of the end runners is provided with a slot 35' closed at its top, which prevents movement of the cam in a direction normal to the surface of the disk 30, as illustrated in Fig. 7. The middle runner is provided with two hook-like extensions 30a, 30a overlying the slot 35, which extensions engage a slot or opening 41 in the mid section of the cam 40, thereby preventing any movement of the cam in the direction of its length.

As stated, a disk or face plate 30 is associated with each of the rotors and moves therewith in its various adjustments. Each of the levers 17 is provided with a slotted ear or lug 20, which is in straddling engagement with the corresponding cam 40, so that, when a given lever 17 is moved up or down to effect the proper correctional adjustment of the stator with respect to the rotor, the corresponding cam 40 is simultaneously adjusted locally in a radial direction with respect to the disk by the manual movement of the engaging lever and this adjustment of the cam will be maintained by the springs 34, which lock the runners in frictional engagement with the disk 30. This adjustment of the cam for a given setting of the condenser and the correctional adjustment of the stator thereof by the lever 17 will insure the reproduction of the correctional adjustment, when the same setting is repeated, by the cam moving the lever to the same extent that it was moved initially in the manual correctional adjustment.

It will be seen, therefore, that by moving the free ends of the levers up and down, the cam 40 is changed in shape simultaneously as the capacity of the corresponding condenser is adjustably altered, so that, when the cams of the three condensers are rotated in changing the dial setting, they simultaneously move their respective levers and stators to the same extent that the latter were moved by the manual actuation of the levers, thereby securing the proper correctional adjustment of each stator at the corresponding setting.

Although the invention has been described with particular reference to the initial manual correctional adjustments of the stator elements by means of the levers 17, which latter also set or adjust the cams to effect the subsequent correctional adjustments automatically, by the cams acting through the levers to move the stators, it will be apparent that the cams 40 may be adjusted manually, in the first instance, to effect the correctional movements of the stators relatively to the rotors, the operative connections between the cams and the stators involving levers, such as 17, or any similar means.

Furthermore, although the cam device has been described as a component part of the operating mechanism of a variable condenser, such application is merely exemplary of one of the many uses to which said cam mechanism may be put.

What I claim is:

1. An adjustable cam mechanism, including a support, a flexible member comprising the working face of the cam, retaining members provided with means for supporting said flexible member at a plurality of points so that one edge of said flexible member is free for contacting a cam follower, said retaining member being mounted on said support solely by friction means whereby they may be successively or simultaneously shifted to change the curvature of said cam.

2. An adjustable cam mechanism, including a flexible member, retaining members provided with means for supporting said flexible member at a plurality of points, a support having engaging means to receive said retaining members and to allow movement of said retaining members with respect to said support, and friction producing means acting between said retaining members and said support, the frictional engagement of said support by said retaining members being the only engagement therebetween, whereby said retaining members may be moved to different positions to change the shape of said flexible member, and are constrained to hold their position after having been moved.

3. An adjustable cam mechanism, comprising a flexible ribbon-like strip, a plurality of retaining members slotted to receive said flexible strip, said retaining members being disposed at a plurality of points along the length of said strip, one edge of said strip extending above said retaining members to allow of contact with a cam follower, a support having slots to receive said retaining members and to allow said members movement in the direction of said slots, and resilient means to hold said retaining members within said slots and to provide friction between said retaining members and said support, said retaining members being held to said support solely by the frictional force generated by said resilient means.

4. An adjustable cam mechanism, comprising a flexible ribbon-like strip incorporating the working face of said cam, a plurality of retaining members slotted to receive said flexible strip, said retaining members being disposed at a plurality of points along the length of said strip, a support having slots to receive said retaining members and to allow said members movement in the direction of said slots, springs to hold said retaining members within said slots and to provide friction between said retaining members and said support, and means continuously contacting said strip to apply force thereto for moving said retaining members, to allow adjustment of the contour of the working face of said cam.

5. The combination of a support, an adjustable cam comprising a flexible member mounted on said support solely by frictional means, a force-transmitting member in continuous engagement with said flexible member, said force-transmitting member being in operative connection with the load to be moved by said cam, the normal load carried by said force-transmitting member producing a force at the point of contact of said force-transmitting member with said flexible member which is smaller than the frictional forces holding said flexible member to said support, whereby said cam retains its shape during its normal operation, but can be made to change its contour to allow adjustment of said cam when a force is applied to said force-transmitting member greater than the frictional force acting between said flexible member and said support.

6. An adjustable cam mechanism including a support, a flexible member, retaining members provided with means for supporting said flexible member at a plurality of points, said retaining members being mounted on said support solely by friction means whereby they may be shifted to change the curvature of said cam, and means continuously contacting said flexible member to apply force thereto for moving said retaining members to allow adjustment of the contour of the working face of said cam.

7. The combination of an adjustable cam comprising a flexible member parts of which are independently movable to different positions by direct application of force to cause a change of contour of said cam, said flexible member continuously contacting an engaging member to cause said engaging member to follow the contour of said flexible member when said flexible member is moved relatively to said engaging member in accordance with the contour of said flexible member; said engaging member also engaging said flexible member to move said flexible member in a direction transversely of the length of said flexible member when said engaging member is moved independently of said flexible member in a direction transversely of the length of said flexible member, whereby adjustment of the contour of said flexible member is effected.

8. An adjustable cam mechanism, comprising a flexible member, a support, retaining members provided with means for holding said flexible member at a plurality of points, said retaining members being also in gripping engagement with said support and movable with respect to said support to allow adjustment of the contour of said flexible member, the magnitude of the frictional force exerted in said gripping engagement and tending to prevent movement of said retaining members with respect to said support being in the normal operation of said cam greater than the working force sustained by said retaining members, but less than a specially applied force brought to act on said retaining members to move them relatively to said support to alter the contour of said flexible member to adjust said cam.

9. An adjustable cam mechanism, comprising a flexible member, a support, retaining members provided with means for holding said flexible member at a plurality of points, said retaining members being also in gripping engagement with said support and movable with respect to said support to allow adjustment of the contour of said flexible member, the magnitude of the frictional force exerted in said gripping engagement and tending to prevent movement of said retaining members with respect to said support being in the normal operation of said cam greater than the working force sustained by said retaining members, but less than a specially applied force brought to act on said retaining members to move them relatively to said support to alter the contour of said flexible member to adjust said cam, and means to apply force to said retaining members to move them to a new position of adjustment.

10. An adjustable cam mechanism comprising a plate support, guiding slots in said support, runners fitting within said slots and bearing against said plate, said runners being provided with resilient means to exert a gripping action on said plate, grooves in said runners extending in a direction perpendicular to the plane of said plate, a ribbon-like flexible member fitting within said grooves and extending above said runners to allow contact with a cam follower, at least one of said runners being provided with means to hold said flexible strip within the groove of said runner.

11. An adjustable cam mechanism comprising a disk-shaped plate support, radial guiding slots in said support, runners fitting within said slots, said runners being provided with extensions contacting one face of said support, springs attached to said runners and exerting pressure against the opposite face of said support to cause a gripping action between said runners and said support, grooves in said runners extending in a direction perpendicular to said plate, a spring strip fitting within said grooves and extending beyond said grooves to allow contact with a cam follower, said spring strip being attached to at least one of said runners to hold said strip within the groove of said runner.

12. An adjustable cam mechanism including a support, a flexible member having parallel and opposed working faces, retaining members provided with means for supporting said flexible member at a plurality of points so that one edge of said flexible member extends beyond said retaining members, said retaining members being mounted on said support by friction means whereby they may be shifted to change the curvature of said cam, and a cam follower contacting the two opposite faces of said flexible member.

13. An adjustable cam mechanism including a support, a flexible member having parallel and opposed working faces, retaining members provided with means for supporting said flexible member at a plurality of points so that one edge of said flexible member extends beyond said retaining members, said retaining members being mounted on said support by friction means whereby they may be shifted to change the curvature of said cam, and an engaging member contacting the two opposite faces of said flexible member, said engaging member being moved by said cam when said cam is moved, and shifting said retaining members to change the curvature of said cam when said engaging member is moved independently of said flexible member.

14. An adjustable cam mechanism including a support, a flexible member having parallel and opposed working faces, retaining members provided with means for supporting said flexible member at a plurality of points so that one edge of said flexible member extends beyond said retaining members, said retaining members being mounted on said support by friction means whereby they may be shifted to change the curvature of said cam, a pivoted lever, a slotted lug attached to said lever, said slot receiving the free edge of said flexible member, said lever having mechanical connection to parts to be moved by said cam when said cam is moved, said lever being also provided with a handle, whereby it may be moved independently of said cam to change the curvature of said cam.

In testimony whereof I affix my signature.

NOEL DEISCH.